(12) United States Patent
Brecheen

(10) Patent No.: US 7,044,087 B1
(45) Date of Patent: May 16, 2006

(54) UNISEX PROTECTIVE GARMENT FOR DOGS

(75) Inventor: Jomain Brecheen, Marrero, LA (US)

(73) Assignee: Jomain Brecheen, Marrero, LA (US)

( * ) Notice: Subject to any disclaimer, the term of this patent is extended or adjusted under 35 U.S.C. 154(b) by 66 days.

(21) Appl. No.: 10/968,234

(22) Filed: Oct. 19, 2004

(51) Int. Cl.
 *A01K 21/00* (2006.01)
 *A01K 23/00* (2006.01)
 *A01K 13/00* (2006.01)

(52) U.S. Cl. .................. 119/868; 119/850; 119/854; 119/838

(58) Field of Classification Search ............... 119/814, 119/850, 838, 854, 868; 54/79.1, 79.2; D30/154, D30/151
See application file for complete search history.

(56) References Cited

U.S. PATENT DOCUMENTS

| 311,267 A | 1/1885 | Springstun |
|---|---|---|
| 1,317,107 A * | 9/1919 | Ruthven ..................... 119/838 |
| 2,539,606 A | 1/1951 | Bailey |
| 2,974,635 A | 3/1961 | McDowell |
| 3,107,653 A | 10/1963 | Goddard, Jr. |
| 3,141,443 A | 7/1964 | Huey |
| 3,176,657 A | 4/1965 | Callaway |
| 3,817,217 A | 6/1974 | Matuka et al. |
| 4,133,297 A | 1/1979 | Denebeim |
| D334,252 S | 3/1993 | Stubbs |
| 5,226,386 A | 7/1993 | Thoma |
| D364,713 S | 11/1995 | Danville |
| 6,557,497 B1 * | 5/2003 | Milligan ..................... 119/854 |

FOREIGN PATENT DOCUMENTS

| GB | 19004 | 10/1903 |
|---|---|---|
| GB | 981247 | 1/1965 |
| GB | 1584825 | 2/1981 |

\* cited by examiner

*Primary Examiner*—Teri Pham Luu
*Assistant Examiner*—Elizabeth Shaw
(74) *Attorney, Agent, or Firm*—Gregory C. Smith

(57) ABSTRACT

A unisex protective garment worn by both male and female animals, particularly dogs, the garment having a first forward harness portion and a rear genitalia protection portion. The rear portion includes a woven vinyl mesh material covering both the male genitalia and the female genitalia, in the same unisex garment, which would allow fluid flow, such as urine therethrough, but would prevent contact between male and female genitalia. This garment, when worn by either a male of female dog, would allow the dog to urinate and defecate, but would not allow the dog to copulate with the opposite sex.

7 Claims, 2 Drawing Sheets

UNISEX PROTECTIVE GARMENT FOR DOGS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to a protective garment for animals, more particularly, dogs. In particular, the present invention relates to a garment which can be worn by an animal such as a dog during menses, or during heat, so as to allow the dog to maintain it normal bodily functions, but to prevent the dog from engaging in copulation.

2. General Background of the Invention

There are millions of dog owners who raise their dogs either in the confines of an interior space such as apartment or a house, or with an enclosed yard. Of course, when the dog is maintained indoors, it is necessary that the dog be allowed to relieve itself exterior to the home or apartment on a regular basis. One of the concerns in this endeavor is the fact that dogs go through a period of being in heat which attracts members of the opposite sex, which may result in unwanted and undesired pregnancy of the dog.

Therefore, there is a need for allowing a dog, whether it be male or female, to be allowed to relieve itself outdoors yet not be susceptible to being impregnated in the case of a female or having the ability to impregnate a female, in the case of a male, when the female is in heat. Also, there is a need for a garment that could be worn by a dog when the dog is undergoing menstruation so that there could be a protective pad placed on the dog so as to avoid the flow from making contact with carpet or furniture, which would cause an unwanted stain or blemish on the item.

There is prior art in this area which is known by the applicant and is listed on the prior art statement which is being submitted herewith.

BRIEF SUMMARY OF THE INVENTION

The apparatus of the present invention solves the problems in the art in a simple and straight forward manner. What is provided is a garment having a first forward harness portion and a rear genitalia protection portion. The rear portion includes a woven vinyl mesh material covering both the male genitalia and the female genitalia, in the same unisex garment, which would allow fluid flow, such as urine therethrough, but would prevent contact between male and female genitalia. This garment, when worn by either a male or female dog, would allow the dog to urinate and defecate, but would not allow the dog to copulate with the opposite sex.

Therefore, it is a principal object of the present invention to provide a garment which may be worn by a male or a female, which would allow normal bodily waste removal functions of the dog through the garment but would not allow penetration through the garment during copulation efforts;

It is a further object of the present invention to provide a garment having a rear protective portion secured around the hips of the dog, and a forward harness portion on the front portion of the dog to provide a unitary system for protecting the rear portion of the dog yet secured in place by the forward harness portion;

It is a further object of the present invention to provide an attractive garment which can be worn by a dog which appears to be a typical piece of clothing, yet serves an additional function of protecting the female from impregnation by a male, and prevents the male from impregnating a female if worn by the male.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
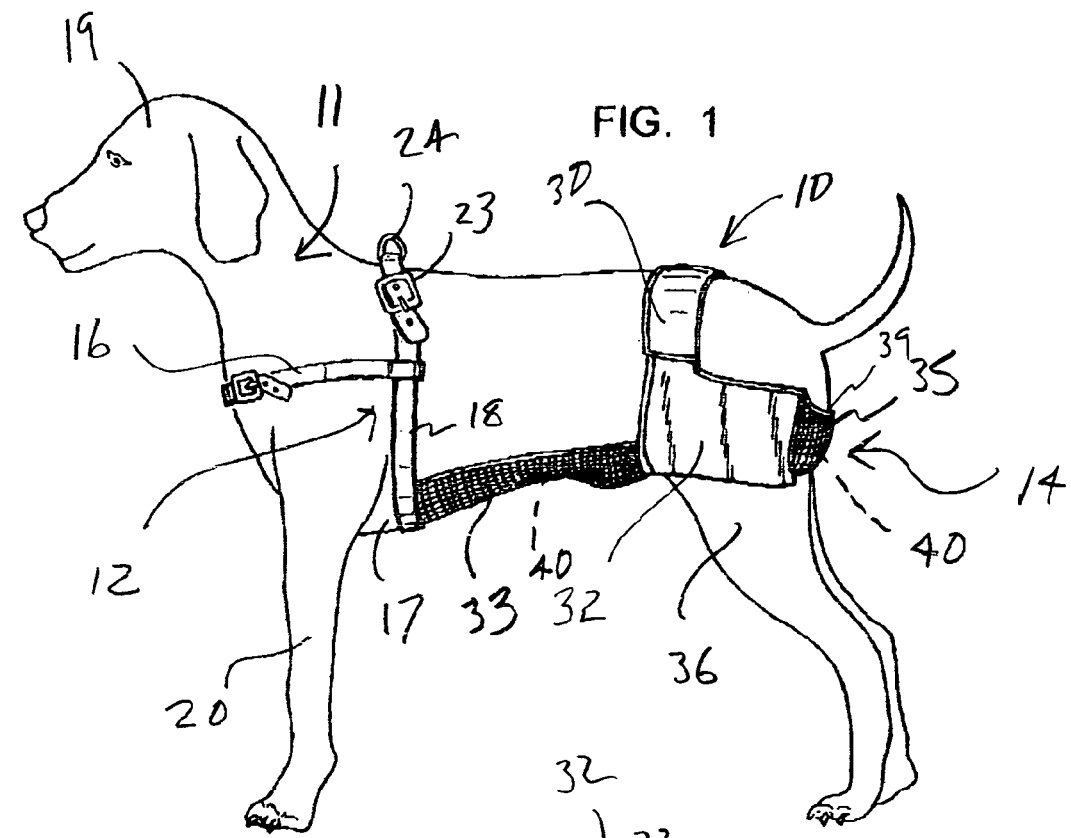
FIG. 1 illustrates a side the preferred embodiment of the apparatus of the present invention worn by a dog.
Figure 2:
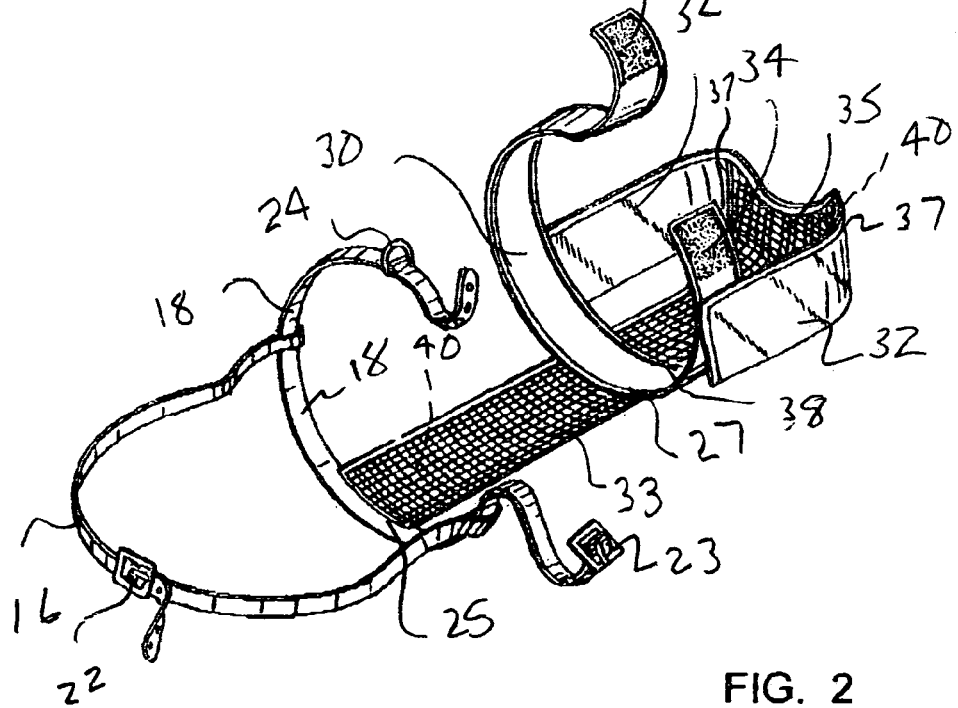
FIG. 2 illustrates an overall perspective view of the garment removed from a dog.
Figure 3:
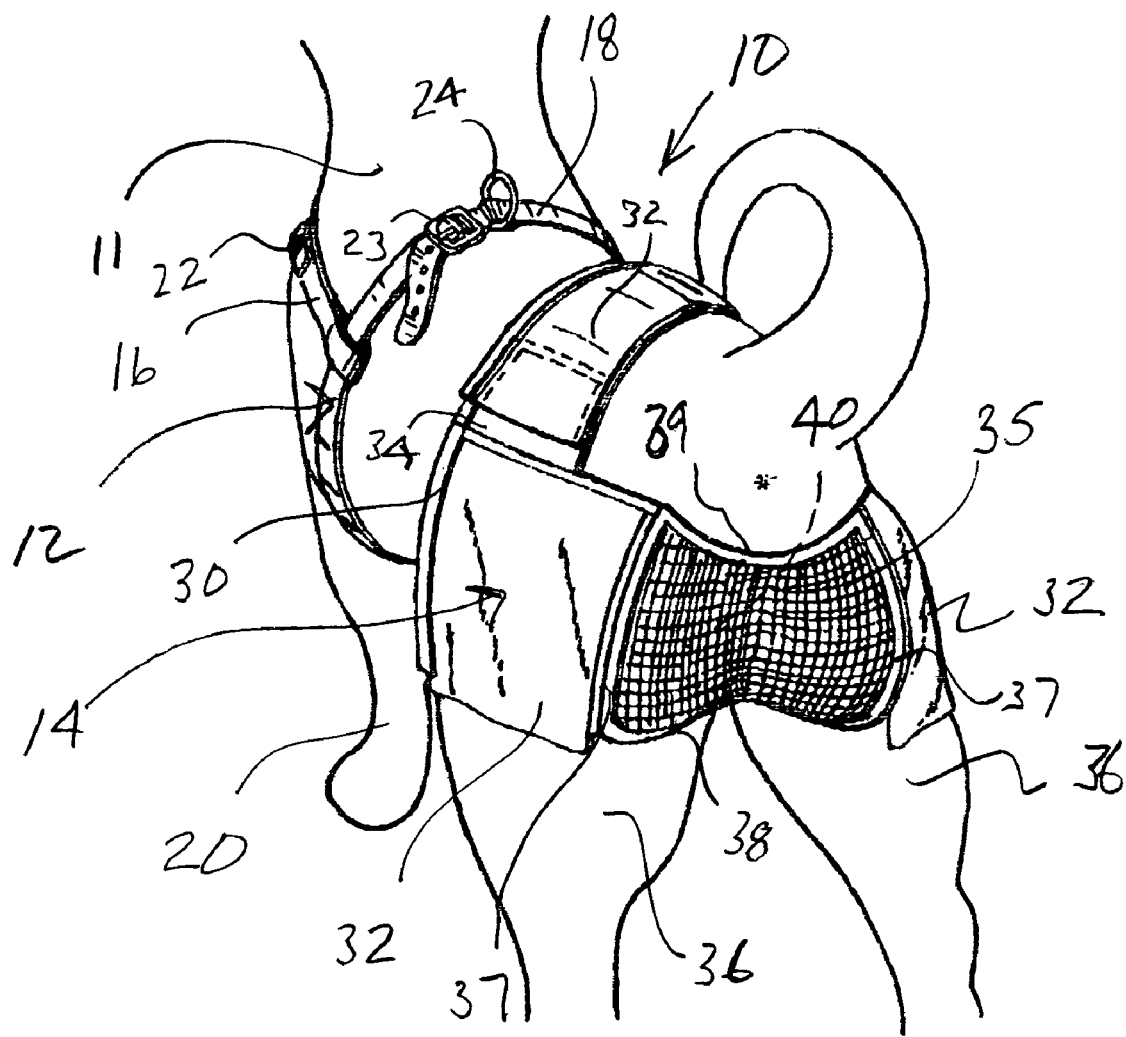
FIG. 3 illustrates a rear view of the apparatus of the present invention worn by a dog.

FIGS. 1 through 3 illustrate the preferred embodiment of the present invention by the numeral 10. For purposes of description the apparatus 10 would be best described as a unisex garment worn by animals, in particular, dogs, to prevent a female dog, wearing the garment from being impregnated by a male dog, and from preventing a male dog, wearing the garment, from being able to penetrate a female dog. The same garment may be worn by either a male and female dogs without having to modify of change the garment.

As seen in FIG. 1, there is illustrated the garment 10, which will be known commercially as the "doggie-duke" garment 10, placed upon a dog 11. Garment 10 has a first forward harness portion 12 connected to a rear protective portion 14. Harness portion 12 comprises a first strap portion 16 encircling the chest 17 of the dog 11, and connected to a strap portion 18, encircling the chest 17 of the dog 11, as would a typical portion, so that the harness portion 12 defines a harness allowing the head 19 and the front legs 20 of the dog 11 to extend from the harness 12. The harness 12 includes a buckle 22 on the first strap 16, a buckle 23 on the second strap 18, for easy placement on the dog. Strap 18 includes a ring 24 for attaching a leash along the back of the dog 11.

As seen in the figures, the rear protective portion 14 comprises a fabric belt 30 extending around the stomach portion of the dog and held in place by velcro ends 32, 34, along the upper back of the dog 11. The strap includes a pair of fabric panels 32, which extend rearward along each thigh 36 of the dog. Engaged to the belt 30 are the two protective panels. As seen in FIGS. 1 and 2, there is provided first protective panel 33, sewn at a first end 25 to strap 18, the panel 33 extending from the strap 18 along the stomach of the dog, extending over the male genitalia and sewn at a second end 27 to that portion of the belt 30 running along the stomach of the dog. The second panel 35, seen more clearly in FIG. 3, is sewn to the two rear edges 37 of the two fabric panels 32, and along a third edge 38 to the belt 30, running along the stomach of the dog 11, so that panel 35 defines a protective panel covering the genitalia of a female dog. An important aspect of protective panels 33 and 35 is that the panels are a vinyl mesh material, having openings 40 through which a dog may urinate while wearing the garment 10, yet not allowing the penis of the male dog to penetrate through the mesh openings 40. The vinyl material is also resistant against the acidic nature of the urine, and yet, is flexible enough to be worn comfortable by the dog 11. It should be noted, also, that the second panel 35 has an upper edge 39 which runs below the dog's anus, so that both a male and female wearing the garment 10 would be allowed to defecate while wearing the garment, also.

The improved unisex (male and/or female) apparatus of the present invention can be used by any dog, fixed or not, indoor or outdoor, male or female, dressy or casual. The apparatus can be used just to make a fashion statement or to serve multiple functions, or many functions, such as to be able to add a glue strip panty liner for the menstrual process for female dogs. The velcro strips are an updated version of the typical first style velcro and help make a stronger, more secure attachment around the waist of a dog.

PARTS LIST

The following is a list of suitable parts and materials for the various elements of the preferred embodiment of the present invention.

| Description | Number |
| --- | --- |
| apparatus | 10 |
| dog | 11 |
| forward harness portion | 12 |
| rear protective portion | 14 |
| first strap portion | 16 |
| chest | 17 |
| strap portion | 18 |
| head | 19 |
| front legs | 20 |
| buckle | 23 |
| ring | 24 |
| first edge | 25 |
| second edge | 27 |
| fabric belt | 30 |
| velcro ends | 32, 34 |
| fabric panels | 35 |
| thigh | 36 |
| third edge | 38 |
| upper edge | 39 |
| openings | 40 |

The foregoing embodiments are presented by way of example only; the scope of the present invention is to be limited only by the following claims.

The invention claimed is:

1. A protective garment to be worn by either a male or female dog, comprising:
   a. a first rear protective portion worn around the hips of the dog;
   b. vinyl mesh panels for extending across the genitalia regions of both a male and female dog, for allowing urine flow therethrough, but preventing copulation by a dog of the opposite sex; and
   c. a forward harness portion connected to the rear protective portion to maintain the garment on the dog while the dog is in heat.

2. The protective garment in claim 1 wherein the garment further comprising fabric portions supporting the vinyl mesh panels extending across the genitalia of the dog.

3. The protective garment in claim 1, wherein the vinyl mesh panels extend across the both female genitalia and male genitalia in a single garment.

4. The protective garment in claim 1, wherein the garment is secured onto the hips of the dog with a belt portion encircling the torso of the dog and secured in place with velcro.

5. A protective garment to be worn by a dog, the garment comprising:
   a. a first rear portion worn around the hips of the dog, further comprising:
      1. a first vinyl mesh panel covering the genitalia of a female dog to prevent contact with the genitalia of the opposite sex, but to allow the dog to urinate through the mesh;
      2. a second vinyl mesh panel covering the genitalia of a male dog to prevent contact with the genitalia of the opposite sex, but to allow the dog to urinate through the mesh; and
   c. a harness portion, to which the first rear portion is secured to define a unitary garment for both male and female dogs.

6. The protective garment in claim 5, wherein the first rear portion is connected to the harness portion along the second vinyl mesh panel.

7. A unisex protective garment to be worn by both a male and female dog respectively, the garment comprising:
   a. a first rear portion worn around the hips of the dog, the rear portion further comprising first and second panels covering the genitalia of the male and the female dog;
   b. a harness portion, to which the rear portion is secured to define a unitary garment for the both the male or female dog wearing the garment; and
   c. the first and second protective panels comprising a vinyl mesh material strong enough to disallow contact between the genitalia of dogs, yet sufficiently porous to allow urine and other fluids to flow through the mesh material while the garment is being worn by the dog.

* * * * *